Aug. 11, 1959   G. SWANSON   2,899,238
VEHICLE WINDOW SEAL
Filed June 7, 1955
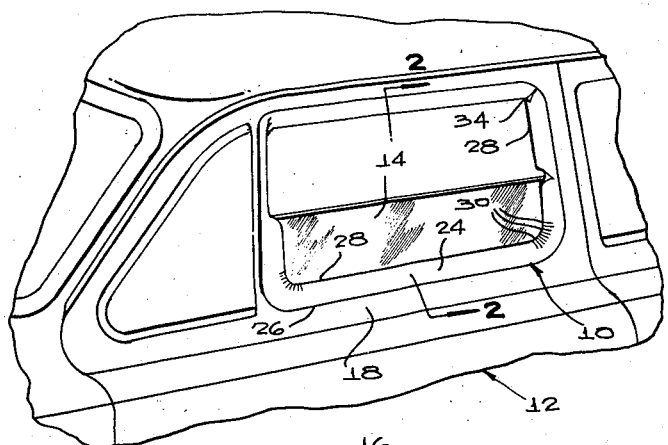
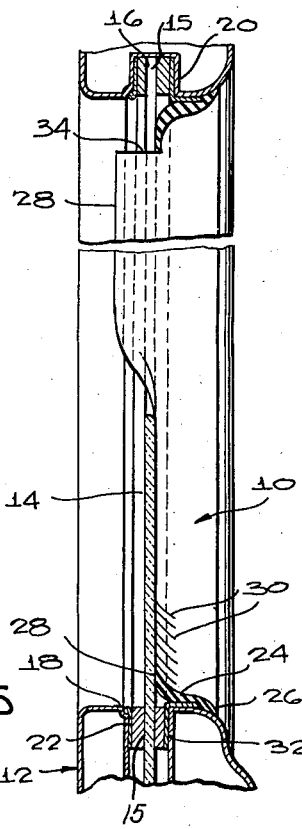
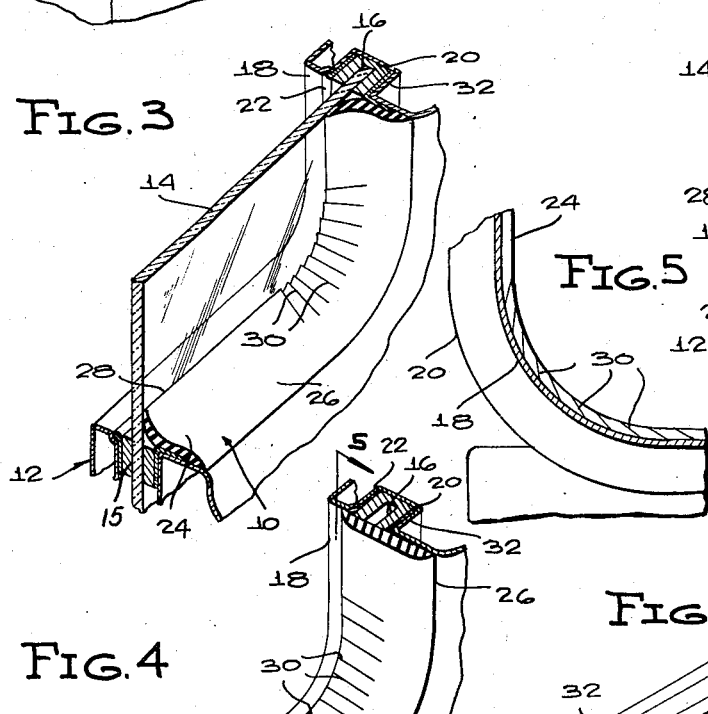
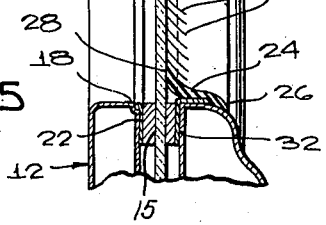
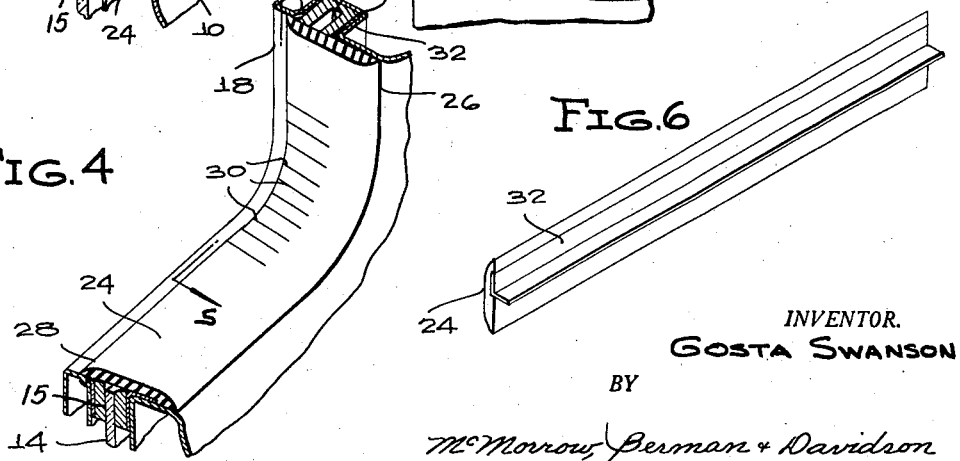
INVENTOR.
GOSTA SWANSON
BY
McMorrow, Berman & Davidson
ATTORNEYS

United States Patent Office 2,899,238
Patented Aug. 11, 1959

2,899,238

VEHICLE WINDOW SEAL

Gosta Swanson, Hollis, N.H.

Application June 7, 1955, Serial No. 513,664

5 Claims. (Cl. 296—49.2)

This invention relates to automobile vehicles, and more particularly has reference to a seal adapted to be attached to the outside of a vehicle, in position to extend about a selected window of the vehicle.

In the present design of automotive vehicles, particularly passenger automobiles, water seeps down between the outer surface of the glass and the outer side of the glass-receiving channel, into the well formed in the automobile body below the glass. Said water tends to have a deteriorating effect upon the portions of the vehicles to which it flows, and may decay wooden portions of the vehicle, while also rusting the vehicle frame as well as the body of the door itself.

The above damaging effect on the vehicle occurs even if the window is fully closed, since the opening or closing of the window has no effect on the seepage of water into this location. Accordingly, an important object of the present invention is to provide a rubber seal for a window of the type described, which will be so designed as to be readily attachable to a window glass of a vehicle, and, when so attached, will protectively seal the crevice through which water is now entering.

Further objects of importance are to provide a device as stated which can be manufactured at low cost, can be secured to and detached from a vehicle window with a marked degree of speed and ease, will be long lasting, and efficient in operation.

Yet another object is to provide means on a resiliently deformable sealing body constituting a part of the invention, so designed as to be readily insertable between the conventional felt and the door body, so as to secure the device in place about the window opening.

Still another object is to form the resiliently deformable body in such a manner that it will be of endless construction, so as to provide a seal over substantially the full perimeter of the opening, while at the same time permitting flexure of the body, particularly at the corners of the window opening, by a glass being raised within the opening.

A further object of importance is to form the device in such a manner that it will provide a seal preventing seepage into the door body that will be tightly engaged between the glass and door body not only in the fully enclosed position of the window, but in any selected open position, and will not interfere with raising or lowering of the window in any respect.

A further object is to provide a seal as described which will not only prevent water seepage into the door body, but will afford measurable protection for the window operator mechanism of the door, preventing dust and other foreign matter from entering said mechanism.

Other objects will appear from the following description, the claims appended thereto, and from the annexed drawings, in which like reference characters designate like parts throughout the several views, in which:

Figure 1 is a fragmentary perspective view of one side of a vehicle equipped with a sealing device formed according to the present invention;

Figure 2 is an enlarged vertical sectional view on line 2—2 of Figure 1;

Figures 3 and 4 are enlarged, fragmentary perspective views of the seal and vehicle window respectively showing the window in open and closed positions;

Figure 5 is a sectional view on line 5—5 of Figure 4; and

Figure 6 is a fragmentary perspective view of the seal per se showing the underside thereof.

The illustrated sealing device of the invention, generally designated at 10, is shown in association with a passenger vehicle 12.

The vehicle 12 has a front door 13 in the upper portion of which is a window assembly comprising a channel 20 extending around a window opening provided in the upper portion of the door. The channel has upper and lower horizontal portions and a pair of vertical side portions connecting the upper and lower portions together. A felt 16 is positioned within and extends entirely around the channel 20, the felt having a slot 15 in which is slidably mounted a window glass 14 for movement from a full closing position with respect to the window opening to a full open position with respect to the window opening.

The sealing device is applied to the outside of the channel 20 either during manufacture of the vehicle or as an attachment to be later incorporated therewith, and comprises an endless substantially flat body 24 of resilient and compressible material. The body 24 extends entirely around the part of the channel upper, lower and side portions exteriorly of the window glass 14 and has, when the window glass is in full closed position, the portion adjacent the inner edge and indicated by the numeral 28 complemental to the upper frame portion adjacent to and outwardly of the felt slot, as shown in Figure 2, and the remaining portion adjacent the inner edge complemental to the side and lower channel portions in sealing engagement with the outer side of the window glass 14. The remaining portion adjacent the inner edge of the body 24 which is complemental to the side and lower channel portions is, by movement of the window glass 14 from the full closing position to the full open position, progressively released by the descending glass 14 to overlie and cover the entire channel 20, felt 16 and felt slot 15 in undeformed, flatwise, sealing position.

The portion of the body 24 adjacent the outer edge is indicated by the numeral 26 and bears against the part of the upper, lower and side channel portions outwardly of the belt 16 and is secured to the channel portions by means of the attaching strip 32 self supporting material such as metal or plastic, having a right angle cross-section throughout its length with one leg of the strip being secured in face-to-face contact with the underside of the body 24 and the other leg projecting outwardly therefrom to engage between one side of the felt 16 and the adjacent wall of the channel 20. The attaching strip 32, when inserted between the felt 16 and the channel wall, is securely engaged therebetween to hold the body 24 in a position where it will be flexible along the portion adjacent the inner edge 28 in a transverse direction, responsive to the closing movement of the window glass 14.

It is to be noted that at the merger points of the portion adjacent the inner edge 28 of the body 24 complemental to the upper horizontal portion of the channel 20 with the parts of the remaining portion adjacent the inner edge 28 of the body 24 compemental to the side portions of the channel 20, there is a transverse slit 34, Figures 1 and 2. By virtue of these slits 34 the parts of the portion adjacent the inner edge 28 of the body 24 complemental to the side portions of the channel 20 are in sealing engagement with the glass 14 or the slot 20 when the window glass 14 is in the full closed position or when moved to either a partial or full open position.

When the window glass 14 has been moved to the full open position the part of the portion adjacent the inner edge 28 of the body 24 complemental to the lower channel portion is extended across the felt slot 15 to not only prevent water from seeping into the window well through the slot of the felt and any other space that may occur between the felt and the channel walls, but also to provide an arm rest which, particularly during hot weather, will be comfortable to the touch, and will prevent deterioration of the body paint where the arm rests thereagainst.

Formed in the inner edge portion 28, at the lower corners of the body, are closely spaced transverse slits 30. These are normally closed, and extend from the blade-like or feathered edge of the inner portion 28 to a location approximately at the longitudinal center line of the body (see Figures 2 and 4). The purpose of the slits is to provide added flexibility of the body at the corners of the window opening, to compensate for the reduction in the inherent flexibility of the body resulting from bending of the same about a corner. Thus, when the window glass is opened, the top edge thereof will bear against the underside of the inner edge portion 28, and will flex the same transversely in an upward direction, as shown in Figure 3. At the location of the slits, the glass will flex the corner part of the portion 28, without difficulty, due to the provision of the slits, the material defined between the slits being free to be moved out of the path of advancing movement of the glass. As shown in Figure 5, the free flexure of the corner parts of portion 28 is enhanced by reason of the fact that the slits are cut obliquely to the length of the body, rather than directly normally to said length. The slits define tongues between them, and when the upper edge of the glass engages against the free edge portions of said tongues, the tongues are individually flexible in an upward direction, to permit movement of the glass beyond them.

The stretch of the elastomeric, deformable body 24 extending across the upper portion of the window opening may be omitted, if desired, provided the corresponding portion of the strip 32 is retained to securely anchor the device in position in the opening. It is usually desirable, however, to include an upper stretch of the body 24 for protecting the felt from exposure, and there is no disadvantage if the thin portion 28 enters the slot 15 with the glass 14. As shown in Figs. 1 and 2 the upper stretch may also be preformed with a down turned inner edge portion 28 to avoid interference with the glass 14 upon closure thereof. The slitting of the upper corners at 34 permits the thin portion 28 of the upper stretch of body 24 to normally lie flatwise over slot 20 and either be deformed into slot 15 by the glass 14, upon closure or be deformed, in the opposite direction, into sealing engagement with glass 14, by the finger of the operator upon closure of glass 14.

It will be understood that the unitary weather seal of this invention is not intended to have any special squeegee or wiping action on the glass 14, but is mainly intended to cover and seal the entire channel 20 as the glass 14 is retracted while offering the minimum resistance to the advance of the glass in a closing direction. Thus while the outer side portion 26 of body 24 is firmly anchored to the outer frame by the detachable strip 32 and immovable relative to the frame, the inner side portion 28, being feather edged and free of reinforcement offers little frictional or other opposition to the advance of the glass 14 in felt slot 15. The ready deformability of the feathered free side portion 28 enables it to progressively twist from flatwise sealing position over channel 20 to inclined sealing position against glass 14 and back again as best shown in Figs. 1 and 2. It will be apparent that if the free side portion 28 were reinforced by embedded metal, by tubular cross section or by undue thickness the entire side portion thereof would tend to move as a unit simultaneously and thus fail to accommodate itself to part open positions of glass 14.

When the window glass 14 is raised, the body, when seen in transverse section, has a compound curvature, with the outer edge portion closely engaging against the surface of the window opening and the inner edge portion bearing resiliently against the glass. Thus, a highly effective seal is provided, completely overlying the exposed portions of the felt and channel, to prevent leakage of water therebetween, with the sealing action being of full efficiency whether the window is fully opened, fully closed, or partially closed to any selected extent.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A unitary weather seal for vehicle windows of the type comprising a channelled frame, a slotted felt in the channel of the frame and a glass slidable in said slot, said unitary seal comprising an elongated body of elastomeric, readily deformable, material of a length at least equal to the total length of the lower and side portions of said channel and mounted adjacent thereto; an outer side portion of said body, overlying the adjacent outer portion of said frame; attaching strip means of self supporting material, at least coextensive in length with, and firmly secured to the underface of, the outer side portion of said body, said strip means having a flange normal to the underface of said body along the longitudinal centre line thereof frictionally retained between said felt and the outer wall of said channel and a free, inner side portion of said body, terminating in a feather edge and of a width greater than the width of said channel, said inner side portion normally extending flatwise across said channel for covering, closing and sealing said channel when said glass is retracted, but being readily and progressively deformable, by said glass, out of the path of said glass into inclined sealing engagement therewith as said glass is advanced in said felt slot from fully retracted to fully advanced position.

2. A unitary weather seal as specified in claim 1 wherein said attaching strip means extends across the upper portion of said channel and entirely around said window for bracing the side portions thereof against inward movement toward each other.

3. A unitary weather seal as specified in claim 1 wherein said attaching strip means is of right angular cross section with one leg thereof secured in face to face engagement with the underface of the outer side portion of said body and the other leg thereof constituting said flange.

4. A unitary weather seal as specified in claim 1 wherein the lower corners of said elastomeric body each include a plurality of closely spaced transverse slits extending obliquely from the inner edge thereof substantially to the longitudinal centre line thereof, said slits forming individually flexible tongues progressively movable in and out of the path of said glass at said corners.

5. A unitary weather seal as specified in claim 1 wherein said body extends along the upper portion of said channel and the upper corners of said body each include a single transverse slit extending from the inner edge thereof substantially to the longitudinal centre line thereof for releasing the adjacent side portions of said body to assume their normal flatwise condition covering said slots until progressively deformed out of the path of said glass by said glass.

References Cited in the file of this patent

UNITED STATES PATENTS

| | | |
|---|---|---|
| 2,192,651 | Rydquist | Mar. 5, 1940 |
| 2,206,334 | Rosner | July 2, 1940 |
| 2,563,252 | Larsen | Aug. 7, 1951 |
| 2,690,350 | Shapiro | Sept. 28, 1954 |

FOREIGN PATENTS

| | | |
|---|---|---|
| 623,299 | Great Britain | May 16, 1949 |